June 14, 1949.  J. J. McCOY  2,473,164
TWO-CYCLE ENGINE
Filed Dec. 7, 1946  3 Sheets-Sheet 1

INVENTOR.
JOHN J. McCOY
BY Hazard & Miller
Attorneys

June 14, 1949.    J. J. McCOY    2,473,164
TWO-CYCLE ENGINE
Filed Dec. 7, 1946    3 Sheets-Sheet 2
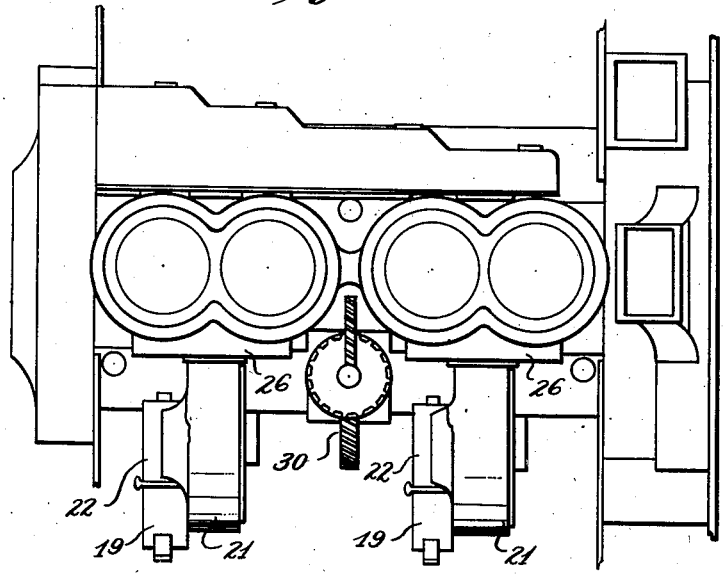
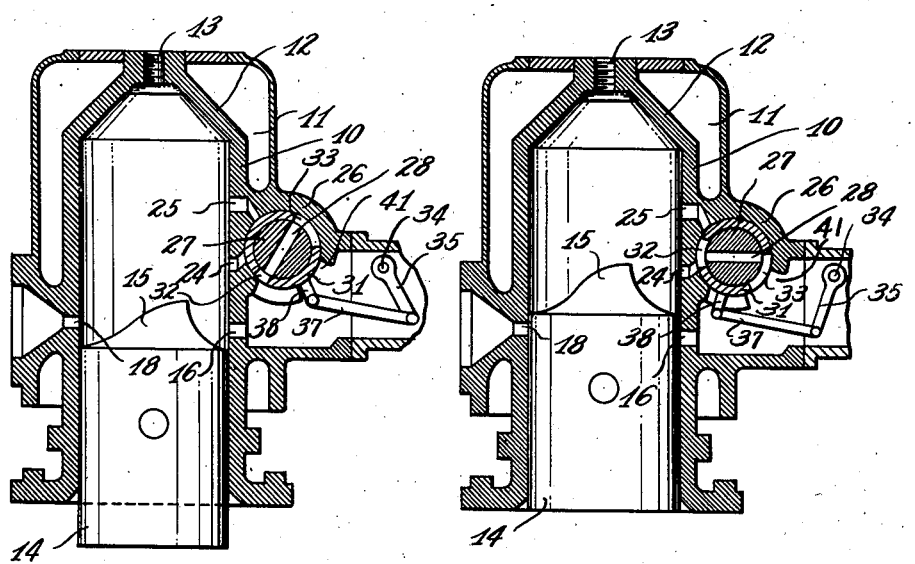
INVENTOR.
John J. McCoy
BY Hazard & Miller
Attorneys

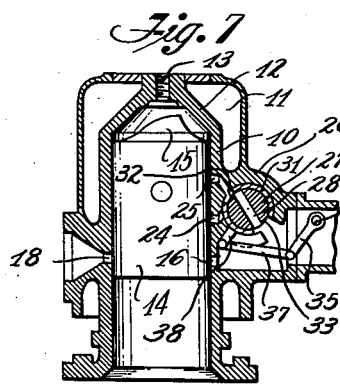
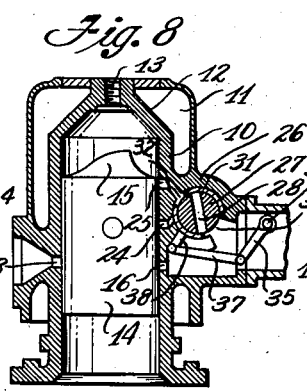
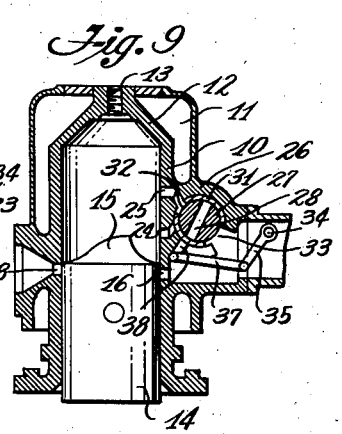
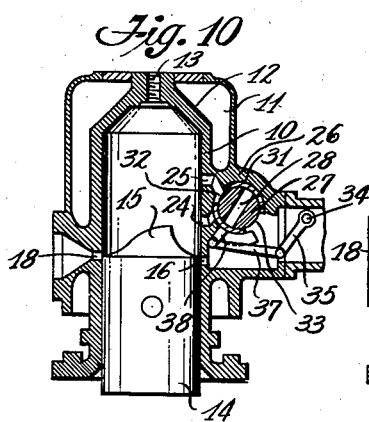
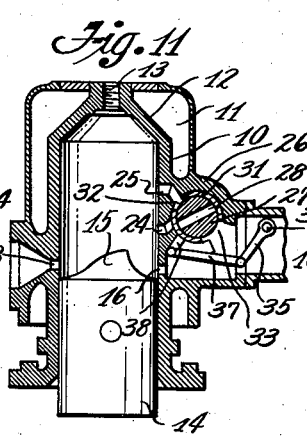
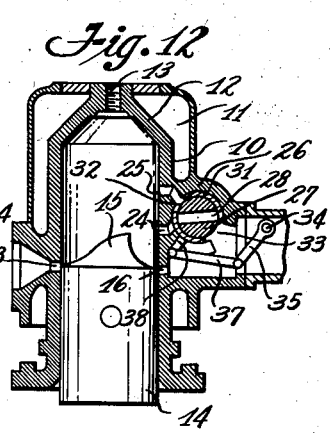
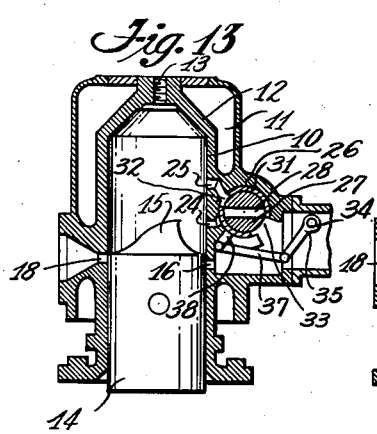
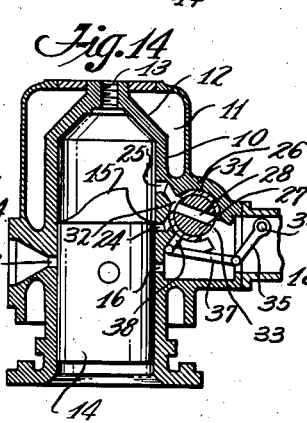
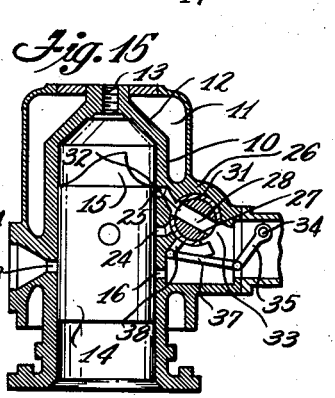

Patented June 14, 1949

2,473,164

UNITED STATES PATENT OFFICE 2,473,164

TWO-CYCLE ENGINE

John Joseph McCoy, Los Angeles, Calif.

Application December 7, 1946, Serial No. 714,791

5 Claims. (Cl. 123—65)

This invention relates to improvements in two-cycle internal combustion engines.

A primary object of the invention is to provide an improved two-cycle engine which can be readily throttled or controlled through a relatively wide range.

In the conventional two-cycle internal combustion engine the fuel charge taken into the cylinder is admitted thereto when the piston therein is at or near the bottom of its stroke exposing or opening an inlet port and exhaust port so that the incoming fuel mixture is to some extent utilized to expel the products of combustion of the previous stroke through the exhaust port. As the piston then rises within the cylinder these ports are closed and the entire volume of the fuel charge taken into the cylinder is compressed and ultimately fired by the spark plug. Inasmuch as the volume of the fuel charge taken into the cylinder is constant, or substantially so, the conventional manner of throttling or controlling a two-cycle engine has been by merely advancing or retarding the spark. In this manner, with a retarded spark, although the same fuel charge is burned, its effectiveness in driving the crank shaft of the engine is less than when the spark is advanced.

The present invention contemplates an improved type of two-cycle engine which provides a greater control or throttling of the engine than is permissible with a variation of the timing of the spark. In accordance with the present invention, although the initial fuel charge taken into the cylinder may be constant or substantially so, so as to be utilized to expel exhaust gases, this fuel charge is not necessarily retained in the cylinder and fired therein. One or more release ports are arranged between the intake port and the cylinder head through which a portion of the charge taken into the cylinder may be released during its compression so that by optionally opening or closing these release ports the volume of the initial charge taken into the cylinder that is retained therein at the time of firing may vary considerably. Thus, if all of the release ports are allowed to remain open during the compression stroke a substantial part of the initial charge is expelled therethrough during compression and only a relatively small fraction of the initial charge is retained in the cylinder and fired therein. Conversely, if all of the release ports are closed, the entire initial charge is retained in the cylinder and is fully compressed so that at the time of firing the engine will be functioning at maximum throttle conditions. With an engine thus designed it is not necessary to vary the timing of the spark so that the fuel burned in the cylinder may be always utilized with maximum efficiency. It will be appreciated, however, that when one or more of the release ports are opened to release a part of the fuel charge during compression the magnitude of the compression when the piston is at the top of its stroke will be reduced and a smaller quantity of fuel is actually being burned under these reduced throttle conditions.

More specifically, another object of the invention is to provide an internal combustion engine having the above mentioned characteristics wherein the portion of the charge taken into the cylinder and which is optionally released through the release ports for reduced throttle operation is returned to the intake manifold of the engine to be subsequently re-introduced into the cylinder during a subsequent cycle of operation. In this manner that portion of the initial charge that is allowed to escape from the cylinder for reduced throttle operation is not wasted but is conserved and used subsequently in the cylinder.

Still another object of the invention is to provide an internal combustion engine of the two-cycle type wherein a carburetor and compressor or blower are utilized to prepare the fuel supplied to the intake manifold under pressure for introduction into the cylinder of the engine and wherein means is provided for optionally releasing the charge taken into the cylinder through release ports along the length of the cylinder back to the manifold, and means is provided for simultaneously throttling the air inlet to the compressor or blower. In this manner, when the release ports release a portion of the charge taken into the cylinder back into the manifold during partial throttle conditions, the amount of fuel that must be supplied from the carburetor to the manifold can be correspondingly reduced by throttling the air intake to the compressor or blower. The amount of fuel supplied to the manifold from the carburetor can be controlled in a manner commensurate with the amount of fuel permitted to escape from the cylinder during compression and returned to the intake manifold for subsequent use.

Another object of the invention is to provide a novel, simple and durable valve action for easily and accurately controlling the amount of the initial charge taken into the cylinder which is released therefrom during compression back into the intake manifold.

With the foregoing and other objects in view, which will be made manifest in the following detailed description and specifically pointed out in the appended claims, reference is had to the accompanying drawings for an illustrative embodiment of the invention, wherein:

Fig. 4 is a top plan view of the entire engine;

Fig. 5 is a sectional view through one of the cylinders and may be regarded as similar to Fig. 3 but illustrating the valve action in that position for maximum throttle operation;

Figure 1:
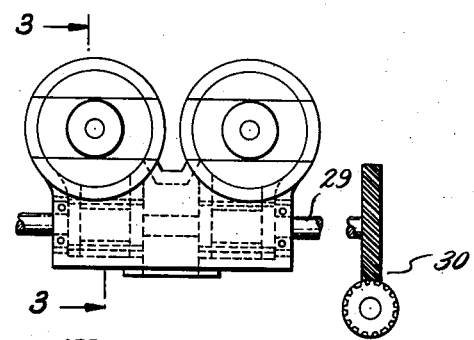
Figure 1 is a schematic top plan view of two cylinders of a two-cycle internal combustion engine embodying the present invention.
Figure 2:
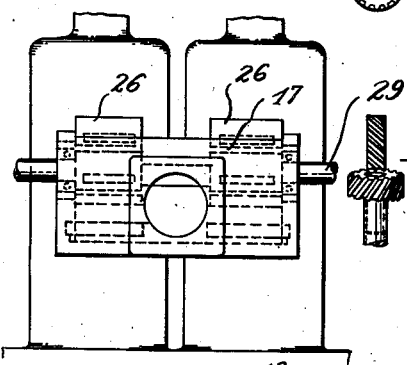
Fig. 2 is a view in side elevation of the same.
Figure 3:
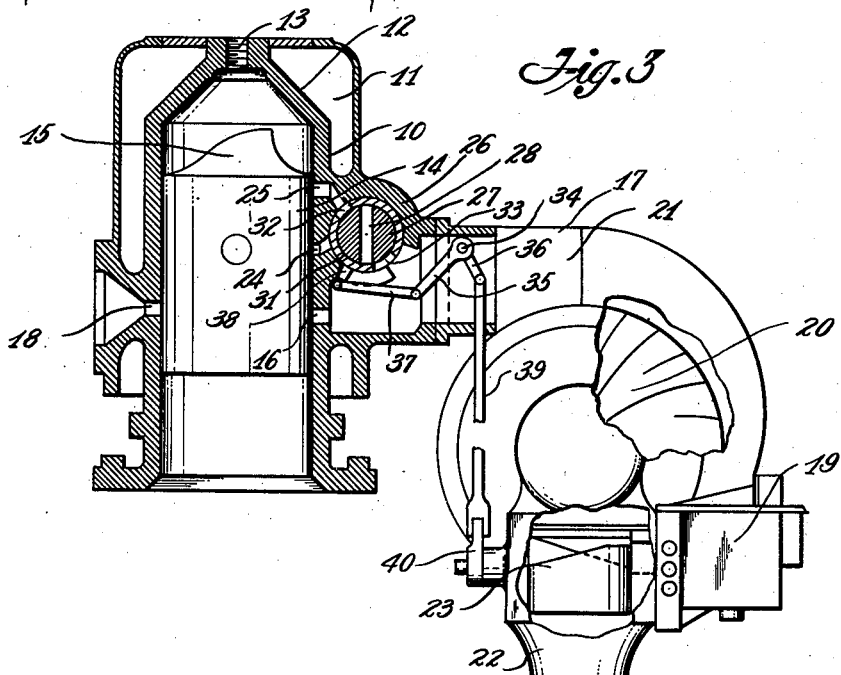
Fig. 3 is a vertical section on an enlarged scale and may be regarded as having been taken substantially upon the line 3—3 upon Fig. 1 in the direction indicated, the valve action being illustrated in minimum throttle position.

Fig. 6 is a view similar to Fig. 5 but illustrating the valve action in that position wherein the engine will be operable under partial throttle conditions intermediate the maximum throttle position shown in Fig. 5 and the minimum throttle position shown in Fig. 3; and Figs. 7 to 15, inclusive, are views similar to Figs. 3, 5 and 6 but illustrating the positions of the valve action at corresponding piston positions through one complete cycle of operation, the adjustable control therefor being shown always in that position for minimum throttle operation or in the position illustrated in Fig. 3.

Referring to the accompanying drawings wherein similar reference characters designate similar parts throughout, the two-cycle engine embodying the present invention may have any required or desired number of cylinders. As illustrated, however, the engine comprises four cylinders arranged in groups of two. A typical cylinder thereof is indicated at 10 which may or may not have a suitable water jacket 11 and a cylinder head 12 in which there is a threaded opening 13 to receive the spark plug. The piston reciprocable therein is indicated at 14 and is connected by a connecting rod, not shown, to the crank shaft, also not shown. The piston 14 may be provided with a suitable baffle 15 conforming to conventional or preferred practice which directs the incoming fuel charge upwardly in the cylinder in such a manner as to assist in scavenging exhaust gases when the piston is at the bottom of its stroke. The inlet to the cylinder for the incoming fuel charge is indicated at 16 consisting merely of a port formed in the cylinder wall communicating with an intake manifold 17. The exhaust port 18 is located on the opposite side of the cylinder from the inlet 16. These ports may conform to any conventional or preferred arrangement and in accordance with two-cycle engine practice they are adapted to be exposed by the piston 14 when the piston is at the bottom of its stroke as illustrated in Fig. 5.

The intake manifolds for the various cylinders are supplied with gaseous fuel from a carburetor indicated at 19 and adjacent this carburetor there is a rotary blower or compressor indicated at 20, the outlet from which, indicated at 21, leads to the intake manifold 17. The air inlet to the blower or compressor 21 is indicated at 22 and is controlled by a rotary valve 23. If gasoline or like fuel is supplied to the carburetor 19, this fuel, on being vaporized, passes from the carburetor through the rotary valve 23 to the blower or compressor 20 and is thus supplied to the intake manifold 17 under pressure to be released from the intake manifold into the cylinder 10 when the intake port 16 is exposed by the piston 14 when the piston is at the bottom of its stroke. The blower or compressor 20 may be driven in any suitable manner preferably off of the crank shaft of the engine.

The invention resides in providing one or more release ports in the cylinder 10 along the walls thereof between the intake port 16 and the cylinder head 12. In the present instance, two of such release ports are shown indicated respectively at 24 and 25. The release port 25 is disposed somewhat higher on the cylinder 10 than the release port 24. Both of these ports are adapted to be covered or exposed by the piston 14 in the course of its stroke. These ports lead to a valve housing generally indicated at 26 within which there is a rotary valve 27 having a diametric port or passage therethrough indicated at 28. There is one rotary valve 27 for each cylinder but the rotary valves for the various cylinders may all be mounted on the same rotary shaft 29 driven in timed relation to the crank shaft and off of the crank shaft such as by timing gears 30. Surrounding the rotary valve for each cylinder there is a ported sleeve valve 31 having ports 32 and 33. This rotary sleeve valve is rotatably adjusted by means of a rocker shaft 34 having arms 35 and 36. Each arm 35 is connected by a link 37 extending through the intake manifold to an arm 38 on its rotary sleeve valve respectively. The other arm 36 is connected by means of a link 39 to a crank 40 on the valve 23 so that on rocking the rocker shaft 34 the sleeve valve 31 may be partially rotated and simultaneously the rotary valve 23 may be partially rotated.

The operation and advantages of the above described construction are substantially as follows. If the sleeve valve 31 is allowed to remain in that position shown in Fig. 5, both of the release ports 24 and 25 are kept closed thereby. In this position of the sleeve valve the rocker shaft 34 has rotated to fully open the air inlet controlled by the valve 23 so that fuel is continually being supplied by the compressor or blower 20 in maximum amount to the intake manifold 17. When the piston 14 is at the bottom of its stroke, as illustrated in Fig. 5, this gaseous fuel which is thus supplied to the intake manifold may enter the cylinder through the inlet port 16 and be deflected upwardly by the baffle 15 to assist in scavenging exhaust gases from the cylinder through the outlet port 18. As the piston rises on its compression stroke the inlet and exhaust ports are closed by the piston and the charge taken into the cylinder is compressed. Under these circumstances the charge that is compressed within the cylinder is the entire charge taken in through the inlet port 16 while the piston 14 is at or near the bottom of its stroke inasmuch as the ports 24 and 25 are maintained in closed position. At or near the top of the stroke of the piston the compressed charge within the cylinder is fired forcing the piston down on its working stroke. In this position of the sleeve valve 31 the engine functions at full throttle condition in that the entire charge taken into the cylinder is retained therein compressed and fired. Consequently under these conditions the engine functions in a manner similar to a conventional two-cycle engine.

On the other hand, if it is desired to operate the engine under partial throttle condition the sleeve valve 31 may be rotated into the position shown in Fig. 6 wherein its port 32 is arranged in communication with the release port 24 and its port 33 is in communication with the outlet port 41 formed in the valve housing 26 and leading back to the intake manifold. When the sleeve valve 31 is in this position the initial charge taken into the cylinder through the inlet port 16 is the same as before but a portion of this charge is not retained in the cylinder. Instead, as the piston 14 rises and begins compressing the charge of fuel, this compressed charge may escape through the release port 24 and through the port 32. The rotary valve 27 which is rotatable within the sleeve is timed with relation to the crank shaft rotating at exactly one-half the speed of the crank shaft and so arranged that at about the time that the piston reaches the release port 24 the diametric passage 28 in the rotary valve establishes communication between ports 32 and 33. Consequently a substantial fraction of the charge initially taken into the cylinder is allowed to escape through the release port 24 and to be returned to the intake manifold 17 for re-introduction into the cylinder during a subsequent cycle or stroke. When the piston 14 rises above the release port 24 it, of course, closes this port and at the same time the rotating valve 27 rotates from the position shown in Fig. 6 to a position cutting off further communication between the ports 32 and 33. In effect, therefore, there is a double seal or closure closing the release port 24, and the balance of the charge initially taken into the cylinder is thereafter compressed and fired. If this balance is but a fraction of the charge initially taken into the cylinder it is manifest that the amount of power imparted to the piston on its down or working stroke is but a corresponding fraction of that which is available when the engine is operating under full throttle conditions and both of the release ports 24 and 25 are closed. This is due to (1) a smaller amount of fuel being present in the cylinder at the time of firing, and (2) the fact that that portion of the charge which is retained in the cylinder is not compressed to such a high pressure. The timing of the spark, however, may remain the same so as to burn the fuel retained in the cylinder in its most efficient manner. That portion of the charge which is released through the release port 24 is not wasted in that it is returned to the intake manifold and is subsequently used in a subsequent cycle of engine operation. The return of the fuel to the intake manifold, however, is in opposition to the flow of fuel from the compressor or blower 20 and consequently the valve 23 which controls the air inlet 22 is operatively connected to the sleeve valve 31 so that when some of the fuel is being returned to the intake manifold 17 through the release port 24 the air inlet to the compressor or blower is closed or throttled a corresponding amount. In the closing of the valve 23 the blower 20 tends to merely churn the air within its housing without building up any greatly increased pressure within the intake manifold 17.

If the sleeve valve 31 is positioned in the position shown in Fig. 3, the release port 24 is closed thereby and the release port 25 is open. This port is located at a point higher on the cylinder walls so that during the compression stroke of the piston a greater percentage of the charge in the cylinder may continue to escape therethrough until the piston 14 closes the release port and the rotary valve 27 has rotated from a position establishing communication between ports 32 and 33. In this position of the sleeve valve the operation of the engine is substantially the same as above described in conjunction with the port 24 with the exception that the release port is located higher on the cylinder and will consequently permit escape of the charge taken into the cylinder for a greater length of time and during a greater percentage of the compression stroke of the piston. Consequently, with the sleeve valve in the position shown in Fig. 3 a minimum proportion of the initial charge is retained and fired in the cylinder so that a minimum amount of power is delivered from the engine.

In Figs. 7 to 15, inclusive, the various positions of the rotary valve 27 with relation to the sleeve valve and with relation to the piston are illustrated. In all of these figures the sleeve valve 31 is illustrated in its minimum throttle position wherein the release port 25 is opened thereby. Thus, in Fig. 7 the piston is illustrated in the position of commencing its downward or power stroke and in this position both of the release ports 24 and 25 are closed by the piston. The port 32 in the sleeve valve is also closed by the valve 27 having rotated sufficiently to be disaligned with relation to the port 32. As the piston continues on its downward stroke indicated by Figs. 8, 9 and 10, the rotary valve 27 continues to rotate at one-half time so that when the piston is at the extreme bottom of its stroke, as illustrated in Fig. 11, valve 27 has rotated ninety degrees from the position shown in Fig. 7. At the extreme bottom of the piston stroke the intake and exhaust ports 16 and 18 are opened by the piston to take in a charge of fuel from the intake manifold.

Fig. 12 illustrates the piston as having commenced on its compression stroke cutting off the intake and exhaust ports and commencing to compress the charge taken into the cylinder. As the charge is compressed it may escape through the port 25 and when the rotary valve 27 opens the port 32 in the sleeve valve, communication with the intake manifold is established and maintained until such time as the piston closes the port 25 as illustrated in Fig. 15. That portion of the charge remaining in the cylinder is then compressed and fired when the piston returns to the position shown in Fig. 7 completing one complete cycle of the engine.

When the engine is operating under these minimum throttle conditions a greater proportion of the initial charge is returned to the intake manifold and under these conditions the valve 23 is closed to a greater extent so that a minimum amount of air is taken into the blower commensurate in amount with that required to supplement what is returned from the cylinder to maintain normal pressure conditions within the intake manifold.

In the preferred form of construction the outlet 21 from the blower is divided with one conduit therefrom leading to each pair of cylinders. The valves 27 of all cylinders, however, may rotate in unison on the same shaft 29 and the sleeve valves 31 may also be rotated in unison by means of the rocker shaft 34 so that all cylinders will be placed either on full throttle operation conditions simultaneously or on partial throttle operating conditions simultaneously, depending on whether release ports 24 or 25 are opened by the sleeve valves.

From the above described constructions it will be appreciated that an improved two-cycle engine is provided which is highly advantageous in that the engine may selectively be caused to operate at full throttle or partial throttle. A great range of power output is permissible although the fuel retained in the cylinder and which is being compressed is fired under efficient conditions. It is possible to operate the rocker shaft 34 between the positions shown in Figs. 3 and 6. Thus, instead of completely opening a release port 24 or 25 as desired, the sleeve valve may be so adjusted as to only partially open these ports. Under these circumstances the sleeve valve will permit but in effect throttle the amount of the charge returned to the intake manifold through a release port. If it is difficult for the released charge to return to the manifold, more of the charge will be retained in the cylinder. On the other hand, if the passages between the release ports and the intake manifold are wide open, egress of the charge from the cylinder is facilitated and more of the initial charge is permitted to escape. In this manner the improved two-cycle engine is quite versatile in its speed of operation and the power delivered. The objection of the conventional two-cycle engine, namely, lack of speed and power variation, is overcome.

Various changes may be made in the details of construction without departing from the spirit and scope of the invention as defined by the appended claims.

I claim:

1. In combination with a two-cycle internal combustion engine having an inlet for a fuel charge to a cylinder thereof, a plurality of release ports arranged along the length of the cylinder toward the cylinder head from the inlet through which a portion of the charge taken into the cylinder may be released, said ports being arranged to be opened and closed by the piston in the cylinder in the course of its strokes, means for opening and closing said release ports including a valve having a passage therethrough, said valve being so connected to the crank shaft as to be aligned with the ports in consecutive fashion in timed relation with upward movements of the piston and means surrounding the valve for optionally opening or closing any of the release ports.

2. In combination with a two-cycle internal combustion engine having an inlet for a fuel charge to a cylinder thereof, a plurality of release ports arranged along the length of the cylinder toward the cylinder head from the inlet through which a portion of the charge taken into the cylinder may be released, said ports being arranged to be opened and closed by the piston in the cylinder in the course of its strokes, and valve means, time driven, with relation to the crank shaft of the engine for consecutively opening and closing said release ports.

3. In combination with a two-cycle internal combustion engine having an inlet for a fuel charge to a cylinder thereof, one or more release ports arranged along the length of the cylinder toward the cylinder head from the inlet through which a portion of the charge taken into the cylinder may be released, said ports being arranged to be opened and closed by the piston in the cylinder in the course of its strokes, a rotary valve, time driven, with relation to the crank shaft of the engine for consecutively opening and closing said release ports, and a ported sleeve valve surrounding the rotary valve selectively adjustable to open or close any of the release ports to the rotary valve.

4. A two-cycle internal combustion engine having an intake manifold, a carburetor, a blower or compressor for delivering the gaseous fuel from the carburetor to the intake manifold under pressure to pass therefrom into the cylinder, means for optionally releasing a portion of the charge from the cylinder while it is being compressed therein back to the intake manifold, and means for throttling the intake to the blower or compressor in an amount corresponding to the amount of charge returned from the cylinder to the intake manifold.

5. In combination with a two cycle internal combustion engine having an inlet for a fuel charge to a cylinder thereof, a plurality of release ports arranged along the length of the cylinder toward the cylinder head from the inlet through which a portion of the charge taken into the cylinder may be released, said ports being arranged to be opened and closed by the piston in the cylinder in the course of its stroke, a rotary valve having a passage therethrough, and means connecting the valve to the crank shaft for causing the passage in the valve to be aligned with a lower port and then with a higher port in consecutive order and in timed relation to upward movement of the piston.

JOHN JOSEPH McCOY.

REFERENCES CITED

The following references are of record in the file of this patent:

UNITED STATES PATENTS

| Number | Name | Date |
| --- | --- | --- |
| 856,790 | Micklewood et al. | June 11, 1907 |
| 1,116,364 | Baker | Nov. 10, 1914 |
| 1,293,508 | Moore | Feb. 4, 1919 |
| 1,330,874 | Jessen | Feb. 17, 1920 |
| 1,413,213 | Badger | Aug. 18, 1922 |
| 2,023,048 | Gentili | Dec. 3, 1935 |

FOREIGN PATENTS

| Number | Country | Date |
| --- | --- | --- |
| 118,144 | Great Britain | 1918 |